United States Patent [19]

Kikuchi et al.

[11] 4,427,985

[45] Jan. 24, 1984

[54] THERMORECORDING MEDIUM, MEANS AND PROCESS FOR PRODUCING AND UTILIZING SAME

[75] Inventors: Yoshiki Kikuchi; Takashi Ohmori, both of Kanagawa, Japan

[73] Assignee: Fuji Xerox Co., Ltd., Tokyo, Japan

[21] Appl. No.: 296,040

[22] Filed: Aug. 25, 1981

[30] Foreign Application Priority Data

Aug. 29, 1980 [JP] Japan .................................. 55/118355
Aug. 29, 1980 [JP] Japan .................................. 55/118356

[51] Int. Cl.³ ........................ G01D 9/00; G01D 15/10
[52] U.S. Cl. ............................. 346/1.1; 346/76 PH
[58] Field of Search ................. 346/1.1, 76 L, 108, 346/135.1, 76 PH

[56] References Cited

U.S. PATENT DOCUMENTS

| | | | |
|---|---|---|---|
| 2,799,167 | 7/1957 | Loconti | 346/135.1 X |
| 3,792,481 | 2/1974 | Magashima et al. | 346/1.1 |
| 4,250,511 | 2/1981 | Stein et al. | 346/76 PH |
| 4,320,406 | 3/1982 | Heinzl | 346/1.1 X |

*Primary Examiner*—Donald A. Griffin
*Attorney, Agent, or Firm*—Sughrue, Mion, Zinn, Macpeak and Seas

[57] ABSTRACT

The thermorecording medium is comprised of a support having coated thereon a plurality of heat-sensitive ink materials each having a different melting point. The ink materials can be formed on strip supports wound on rolls which can be utilized by passing the medium close to a finely focused heat source while the inked side of the support is in contact with a recording sheet. The medium may be in the form of an endless belt which can be rotated within a device in such a manner that the medium is continuously reused.

8 Claims, 11 Drawing Figures

THERMORECORDING MEDIUM, MEANS AND PROCESS FOR PRODUCING AND UTILIZING SAME

FIELD OF THE INVENTION

This invention relates to the field of thermo-transfer recording medium as well as means and processes for producing and utilizing such medium, more specifically, the invention relates to a thermorecording medium which include a plurality of heat-sensitive ink materials having different melting points coated thereon in such a manner that the medium can produce various tone gradations.

BACKGROUND OF THE INVENTION

Conventional thermo-transfer recording medium are comprised of a substrate sheet having thermosensitive solid ink disposed thereon. Although two or more different kinds of ink may be disposed on the substrate sheet, all the inks have the same melting point. Accordingly, the medium prepared cannot be utilized to obtain an intermediate tone by a process which applies a single temperature over a given area.

Recently, other thermorecording medium have been developed which are utilized to place an image on a recording sheet having different tones. The thermal medium includes a support and heat-sensitive ink spots different in tone from one another placed on different spots of the substrate. However, each of the heat-sensitive ink spots is comprised of an ink having the same melting point. Accordingly, it is not possible to utilize the application of different temperatures to obtain different tones on the recording sheet. Furthermore, it is not possible to obtain any given number of different tones at any particular point on the recording sheet.

In order to utilize a thermorecording medium as referred to above having inks of different tones positioned on the substrate, a particular type of heat-generating element must be utilized. In order to obtain the different tones available from the different spots of ink placed on the substrate, the heat-generating head must be precisely constructed and aligned so that heat can be applied to particular spots on the medium which are necessary to create the desired tone.

By placing different colored ink on different places on the substrate, a multi-colored image can be placed on the recording sheet. However, the heat-generating elements of the heat-generating head as well as the electrical leads in connection therewith must be precisely aligned and positioned depending upon the position of the different colored ink on the substrate. Accordingly, the construction of such a heat-generating element as well as its operation is delicate and intricate and therefore expensive.

SUMMARY OF THE INVENTION

The thermal recording medium of the present invention are capable of producing images on a recording sheet having intermediate tones. The medium are comprised of a support sheet having disposed thereon a plurality of heat-sensitive inks which are fluidized by heating, said inks having different melting points. The ink may be disposed such that inks of different tones, colors and different melting points are placed on the substrate in a pattern or the medium may be comprised such that the substrate is covered by a plurality of heat-sensitive ink layers wherein each layer has a different melting point, with the layers arranged on the support in order of decreasing melting point.

The medium can be produced in a long strip rolled onto a rool or placed on an endless belt which is continuously reused. In order to produce the medium, the strip or belt is passed across a series of rollers which apply the heat-sensitive ink to the substrate in particular patterns such that spots of heat-sensitive ink, of three or more different melting points, are positioned in a regular pattern on the substrate. Each particular heat-sensitive ink is applied by a different roller applicator.

It is also possible to produce the medium by using different applicators to apply different layers of heat-sensitive ink, with each layer having a different melting point. When the medium is produced on an endless belt, the ink is first applied to the substrate in either the pattern or layered form. Thereafter, the medium is brought into contact with a recording sheet and heat is applied in order to melt the ink and form the image on the recording sheet. After passing away from the recording sheet, the substrate is subjected to higher temperatures so that all the ink is melted away. The excess melted ink is then wiped from the substrate and a new pattern or layer structure of heat-sensitive ink is again applied to the substrate for reuse.

An object of this invention is to present a thermal recording medium comprised of a support having coated thereon a plurality of heat-sensitive ink materials, each having different melting points.

Another object of this invention is to present a process for producing a thermorecording medium comprised of a support having coated thereon a plurality of heat-sensitive ink materials each having a different melting point.

Yet another object of this invention is to present a device capable of producing a thermorecording medium comprised of a support having coated thereon a plurality of heat-sensitive ink materials, each having a different melting point.

Still another object of this invention is to present a means and process for utilizing an ink-recording medium having a plurality of heat-sensitive ink materials coated thereon, with each of said materials having a different melting point.

Still yet another object of this invention is to present a means and mechanism for continuously producing and utilizing a thermal recording medium comprised of a support having coated thereon a plurality of heat-sensitive ink materials, each having a different melting point.

Another object of this invention is to present a thermal recording medium comprised in such a manner that it is capable of being utilized to produce a variety of intermediate tones on a recording sheet.

Another object of this invention is to present a thermal recording medium which can be utilized to produce intermediate tones in connection with a device which does not require precise placement of heating heads.

Another object of this invention is to present a thermal recording medium which is comprised of a support having a plurality of layers of ink-sensitive material coated thereon in order of decreasing melting point.

Another object of this invention is to present a thermal recording medium comprised of a support in the form of an endless belt having coated thereon either a pattern of different ink materials having different melting points or a plurality of layers of ink materials having different melting points.

Another object of this invention is to present a thermal recording medium comprised of a support having coated thereon a mosaic pattern of heat-sensitive ink materials each having a different melting point wherein three or more different ink materials are utilized.

These and other objects and advantages of the present invention will become apparent to those persons skilled in the art upon reading the details of construction and usage as more fully set forth below. Reference being made to the accompanying drawings forming a part hereof wherein like numerals refer to like parts throughout.

DETAILED DESCRIPTION OF THE INVENTION

Before the present invention is described in detail, it is to be understood that the invention is not limited to the particular arrangement of components and parts as shown, as such devices may vary. It is also to be understood that the terminology used herein is for purposes of describing particular embodiments only, and is not intended to be limiting of the scope of the present invention.

Figure 1:
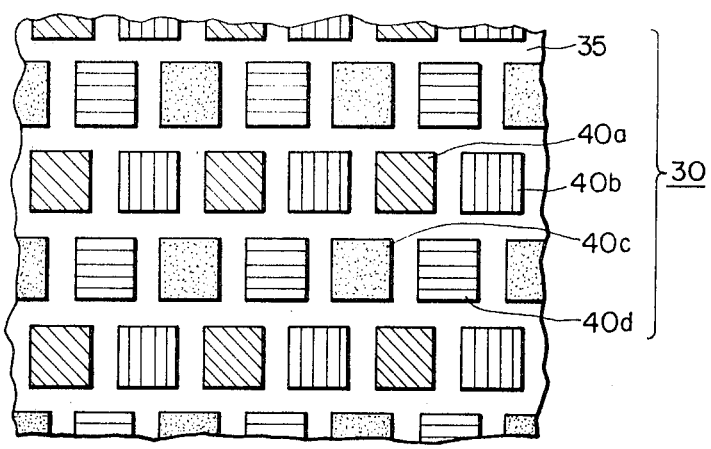
FIG. 1 is a front plan view of a conventional thermorecording medium.

Referring now to the drawings, and to FIG. 1 in particular, conventional thermal recording medium can be described in detail. FIG. 1 shows a top plan view of a conventional medium 30. The medium 30 is comprised of a support or base layer 35 having coated thereon square-shaped spots of heat-sensitive ink 40a, 40b, 40c and 40d. Each of the ink spots 40a–40d includes ink or pigments of a different color and/or tone. However, each of the ink spots is comprised of materials in such a manner that all of the different ink spots 40a–40d melt at the same temperature.

When utilizing the medium 30 as shown within FIG. 1 to form an image on a recording sheet, it is, of course, often desirable to utilize all of the different tones and/or colors 40a–40d at a particular place on the image being formed on the recording sheet. When all the colors and/or tones are to be utilized at a particular point of the image being formed provided that a combination of the tones or colors is not required, little or no difficulties arise in the formation of the image since a heating element can be utilized to apply uniform temperature at that area which liquifies all of the ink spots. However, during the formation of an image, it is often desirable to utilize a single tone and/or color or to exclude a single tone and/or color of the four tones and colors 40a–40d. Even when no overlap is required, in order to utilize only a single tone and color or to exclude a single tone or color, it is necessary to precisely place the heating element being utilized to liquify the ink spots.

Figure 2:
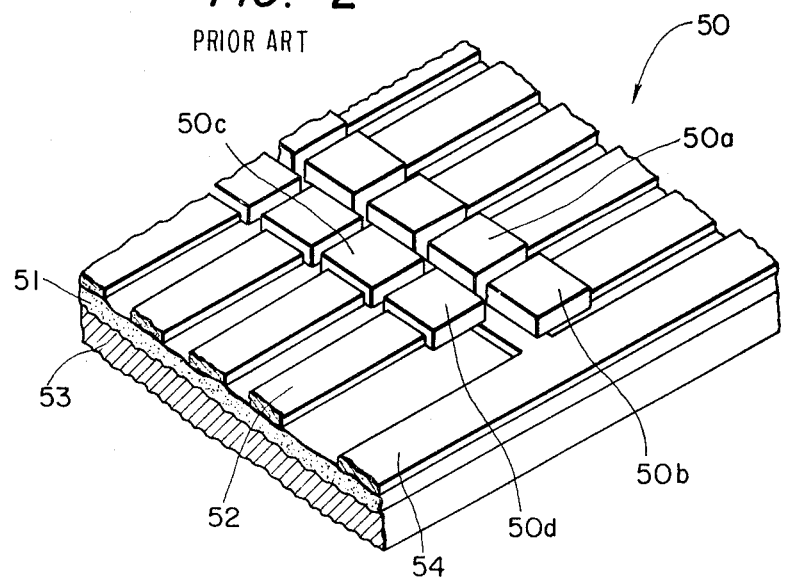
FIG. 2 is a perspective view of a conventional heat generating head.

FIG. 2 is a perspective view of a conventional heat generating head 50 which can be utilized to precisely heat the spots 40a–40d as shown in FIG. 1. The element 50 as shown in FIG. 2 includes a plurality of square-shaped heating heads such as 50a, 50b, 50c and 50d. By precisely aligning the heads 50a–50d to correspond with the spots 40a–40d on the medium 30, it is possible to produce an image on a recording sheet having a particular color and/or tone.

The heating element 50 is comprised of a heat-resisting and heat-insulating substrate 51 positioned over a metal support 53. Electrical leads 52 may be connectable to a common bus 54 in order to complete an electrical connection with the heating elements 50a–50d positioned thereon. It is possible to activate all or any of the heads 50a–50d by electrical means by passing current through the leads 52 to the common bus 54. During the operation of a heating element 50, in conjunction with a medium 30 as shown in FIG. 1, it is necessary to precisely position the medium 30 with respect to the element 50 or one of the heads 50a–50d may overlap two of the spots 40a–40d creating undesirable colors or tones. Accordingly, the medium 30 and element 50 must be precisely constructed with respect to one another and must be operated in a precise manner in conjunction with one another to form an image of any particular tone or color.

Figure 3:
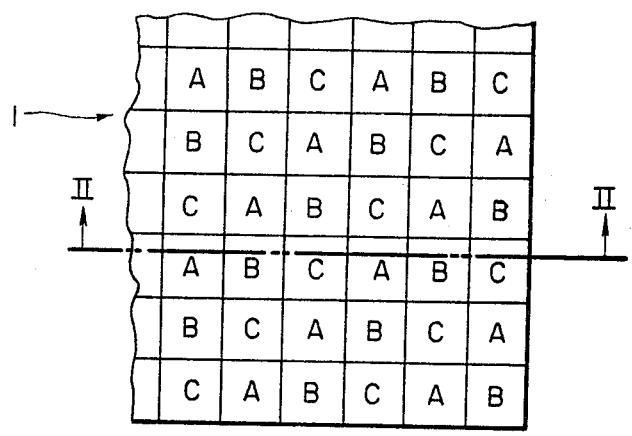
FIG. 3 is a front plan view of a mosaic patterned embodiment of the thermorecording medium of the present invention.
Figure 4:
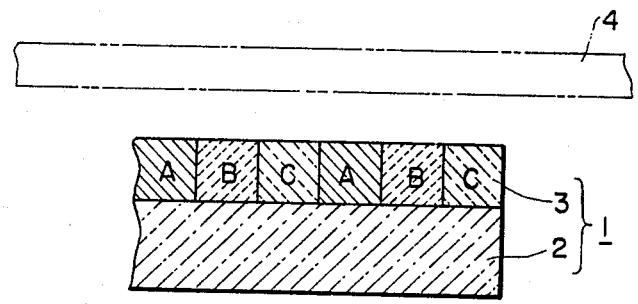
FIG. 4 is a cross-sectional longitudinal view of the mosaic patterned theremorecording medium of the present invention and a recording sheet.

Referring now to FIG. 3, one embodiment of the thermal recording medium of the present invention can be explained in detail. The medium 1 consists of a base member 2 as shown in FIG. 4 and a mosaic pattern of thermal-sensitive ink 3 positioned within squares A, B and C. The thermal-sensitive ink 3 is positioned in a regular pattern of squares A, B and C as shown in FIGS. 3 and 4. However, it is possible to utilize a greater number of different types of thermal-sensitive ink and/or to position the different types of ink in different patterns in order to obtain different effects. However, each of the different types of ink must have a different melting point.

In the specific medium 1 as shown in FIGS. 3 and 4, the thermo-sensitive ink within block B has a melting point higher than the thermo-sensitive ink A and the melting point of the thermo-sensitive ink C is higher than that of thermo-sensitive ink B. The area of the respective thermo-sensitive ink A, B or C must be less than one-third the area of the recording dot to be placed on the recording sheet to form the image.

In order to utilize the medium 1 as shown in FIGS. 3 and 4, a mosaic pattern of thermo-sensitive ink may be placed on a strip substrate which can be wound onto a roll or placed on an endless belt. Due to the different melting points, the areas A, B, and C may be placed adjacent each other, without bad effects.

The medium is passed close to a heating element which may be a conventional heating element as shown in FIG. 2. However, since the different heat-sensitive ink areas A, B, and C melt at different temperatures, different types of heating elements may be utilized as will be explained further below. When a conventional heating element is utilized, the voltage which is passed to the head of the heating element can be precisely controlled in order to obtain a specific temperature at the head. Accordingly, by precisely controlling temperature as opposed to the relative position of the head and heat-sensitive ink areas, it is possible to obtain any desired pattern of tones and/or colors. By utilizing a medium as shown within FIGS. 3 and 4, wherein all of the areas A, B and C include a single color ink such as black, it is possible to obtain four tone gradations, including white of the recording sheet itself, light grey wherein a single ink area such as the area A is utilized, dark grey wherein two areas such as areas A and B are utilized and black wherein ink from areas A, B and C are utilized. As will be clearly understood to those skilled in the art, as the medium is heated, to any particular temperature corresponding to the melting points of areas A, B and C, the medium is brought into contact with a recording sheet in which the image is to be formed.

For purposes of example, the composition of the heat-sensitive ink materials on a typical recording medium as shown in FIGS. 3 and 4 is described below in Table 1, wherein all amounts are percentage weight amounts based on the total weight of the thermosensitive ink.

TABLE 1

| Thermo-sensitive ink | Binder Carnauba (ester) Wax | Color forming material Dyestuff or pigment | Softener Lubricating oil | Melting Point (°C.) |
|---|---|---|---|---|
| A | 30 | 50 | 20 | 60 |
| B | 25 | 50 | 25 | 70 |
| C | 20 | 50 | 30 | 80 |

The thermal transfer recording medium 1, as shown in FIG. 3, and specifically described within Table 1, includes three kinds of thermosensitive ink A, B and C. When the medium 1 is utilized in connection with a heating element and the heating heads are set at a temperature of from about 60° C. to about 70° C., only the thermosensitive ink A is fluidized and therefore transferred to the recording sheet. When the temperature of the recording medium 1 is heated to a range of about 70° to 80° C., the thermosensitive inks A and B are both fluidized and transferred to the recording sheet. When the temperature of the recording medium is heated above 80° C., all of the thermosensitive inks A, B and C are fluidized and transferred to the recording sheet. Accordingly, an image having a concentration of 4 gradations and presenting an intermediate tone can be produced on a recording sheet. It should be noted that the number of gradations can be increased by increasing the number of different kinds of thermosensitive ink having different melting points.

Figure 5:
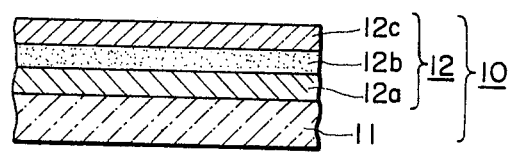
FIG. 5 is a cross-sectional longitudinal view of a multi-layer structure embodiment of the thermorecording medium of the present invention.
Figure 6:
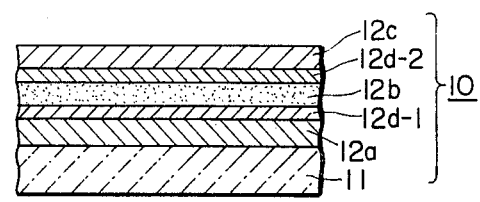
FIG. 6 is a cross-sectional longitudinal view of a second embodiment of the multi-layered structure of the thermorecording medium of the present invention.

By referring now to FIGS. 5 and 6, two different embodiments of the multi-layered structure of the thermal recording medium of the present invention can be described in detail. FIG. 5 is a cross-sectional, longitudinal plan view of a first embodiment of a multi-layered ink structure of the thermal recording medium of the present invention. The medium 10 is comprised of a base or substrate layer 11 with heat-sensitive ink layers 12 coated on the base 11. More specifically, ink layers 12a, 12b and 12c are coated on one surface of the base 11, with the layers being coated in order of decreasing melting point. The heat-sensitive ink layer 12a has a higher melting point than the heat-sensitive ink layer 12b which in turn has a higher melting point than the heat-sensitive ink layer 12c. The specific composition of the layers 12a, 12b, and 12c are disclosed below within Table No. 2 wherein all amounts are percentage by weight amounts based on the total weight of the heat-sensitive ink.

TABLE 2

| Heat-sensitive ink | Binder Carnauba wax | Coloring matter Dye (or Pigment) | Softening agent Lubricant | Melting Point |
|---|---|---|---|---|
| 12a | 20 | 50 | 30 | 80° C. |
| 12b | 25 | 50 | 25 | 70° C. |
| 12c | 30 | 50 | 20 | 60° C. |

As indicated within Table 2, each of the layers may contain a coloring matter dye or pigment. It is possible to produce a thermosensitive recording medium capable of producing an intermediate tones wherein the pigments or dyes within each of the layers are the same. Different colored pigments can also be used within each or any of the layers and different numbers and thicknesses of layers can be utilized.

Figure 10:
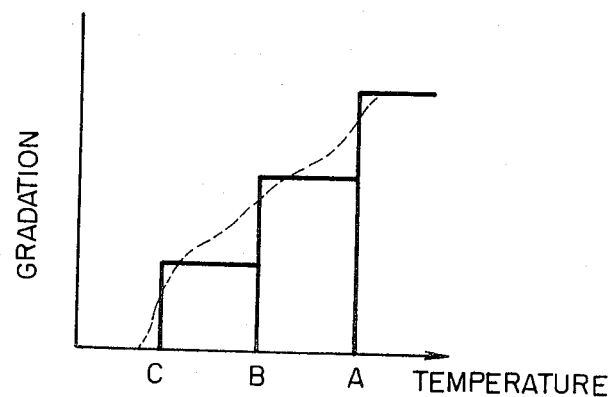
FIG. 10 is a graph wherein temperature versus gradation having been plotted with respect to the heat-sensitive ink multi-layer film of the present invention has been plotted.

When a single type of pigment is utilized with an embodiment as shown within FIG. 5, the tone variations are obtained by the different amounts of ink which are supplied at a particular area. Greater amounts of ink are applied to the recording sheet at areas where higher temperatures are applied to the medium. A graph of gradation versus temperature is shown within FIG. 10.

If the dye or pigment within each of the layers 12a, 12b and 12c has a different color then the image produced can have three different colors in addition to the white background of the recording sheet. The number of colors can, of course, be increased by increasing the number of heat-sensitive ink materials of different melting points and obtain different color mixtures known to those skilled in the art.

Although it is possible to utilize the recording medium as shown within FIG. 5 in connection with a conventional heating element as shown within FIG. 2, it is also possible to utilize a laser as the heating source. The temperature variations can be obtained by controlling the power of the laser during irradiation. A second embodiment of the layered-type structure of the thermal recording medium of the present invention is shown within FIG. 6. The embodiment shown within FIG. 6 includes substrate 11 and layers 12a, 12b and 12c in a manner similar to the embodiment shown within FIG. 5. However, the embodiment of FIG. 6 also includes a layer 12d-1 and 12d-2. The layer 12d-1 is a white heat-sensitive ink layer whose melting point is lower than the melting point of the heat-sensitive heat layer 12a and higher than that of the heat-sensitive ink layer 12b. The layer 12d-2 is a white heat-sensitive ink layer whose melting point is lower than the melting point of the heat-sensitive ink layer 12b and higher than that of the heat-sensitive heat layer 12c.

When utilizing the medium as shown within FIG. 6, the white heat-sensitive ink layer 12d-2 is transferred onto the heat-sensitive ink layer 12c which has been transferred onto a recording sheet. Accordingly, the tone of the heat-sensitive ink layer 12c l *is covered by the white heat-sensitive ink layer 12d-2*. Therefore, the effect of the tone of the heat-sensitive ink layer 12c on the heat-sensitive ink layer 12b can be eliminated. In a similar manner, when the heat-sensitive ink layer 12d-1 is transferred onto the heat-sensitive layer 12b, the tone of the layer 12b is covered by the layer 12d-1. Therefore, the effect of the tone of the heatsensitive ink layer 12b on the heat-sensitive ink layer 12a is eliminated.

By constructing a medium in the manner as shown in FIG. 5, a heat-sensitive recording medium can be easily produced. The substrate is coated with the heat-sensitive ink composition having the highest melting point. Thereafter, the ink within layer 12b, having the next highest melting point, it superimposed on layer 12a. Thereafter, the layer 12c, having the lowest melting point, is superimposed on the layer 12b. By utilizing such a construction, precise placements of different colored and/or tonal gradations of ink is unnecessary. A mechanism and process for producing such a heat-sensitive recording medium will be described in detail below with respect to FIG. 11.

Figure 7:
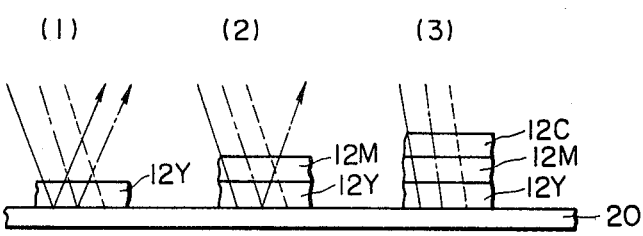
FIG. 7 is a cross-sectional longitudinal view of an image formed on a recording sheet after active contact with the multi-layered structure of the thermorecording medium of the present invention as shown in FIG. 5.

FIG. 7 is a cross-sectional view of a recording sheet 20 having multi-colors and/or tones positioned thereon as a result of contact with a recording medium such as that disclosed within FIG. 5. The first area (1) on the far left of FIG. 7 was contacted with the recording medium of FIG. 5 during such a time when the heating element utilized was raised to a temperature of around 60° to 70° which melted the layer 12c, allowing it to transfer onto the recording sheet 20. The second area (2) in the center of FIG. 7 was contacted with the recording medium of FIG. 5 during a time when the heating element was raised to a temperature of around 70° to 80°. The third area (3) on the far right of FIG. 7, was contacted with the medium shown in FIG. 5 during a time at which the heating element was raised to a temperature of 80° or higher, making it possible to melt all three layers 12a, 12b and 12c which were then transferred to the recording sheet 20.

The left, middle and right areas of the sheet 20 shown in FIG. 7 all have three lines indicating incident light. Although the Figure does not show incident light striking the sheet 20 by itself, the sheet 20 would reflect all three lines of incident light. The area to the far left (1) covered by only the ink from layer 12c reflects two bands of light which might give, for example, a light grey color. The middle area (2) reflects one of the bands of light which might give, for example, a dark grey color, and the far right area (3) does not reflect any of the light which might give, for example, a black color. Based on the above description with respect to FIGS. 5, 6 and 7, those skilled in the art will readily recognize that different colored and/or tonal gradations can be obtained by utilizing different colors and numbers of layers of different melting points.

Figure 8:
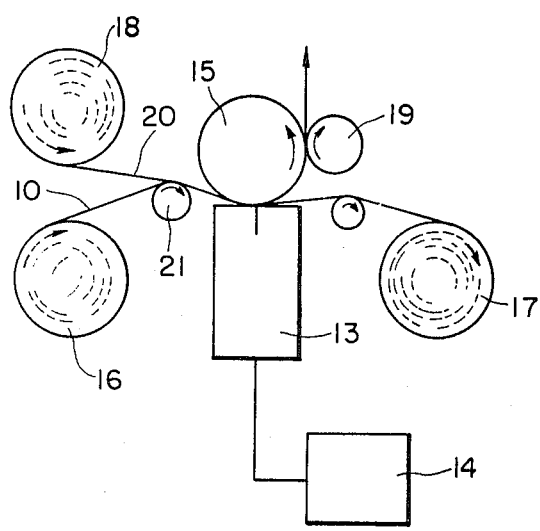
FIG. 8 is a schematic plan view of a device utilizing the thermorecording medium of the present invention.
Figure 9:
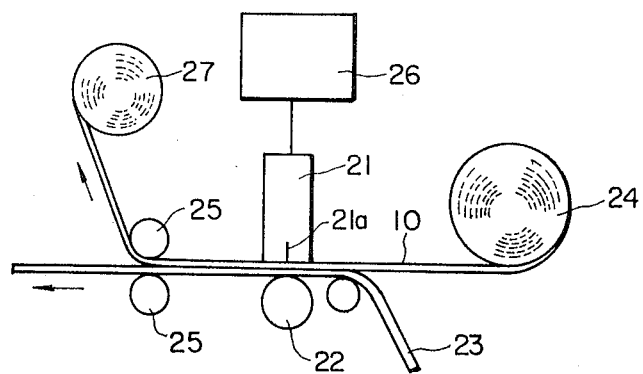
FIG. 9 is a schematic plan view of a second embodiment of a device utilizing the thermo-recording medium of the present invention.

The utilization of the thermosensitive recording medium of the present invention can now be described with reference to FIGS. 8 and 9. FIGS. 8 and 9 each show schematic diagrams of devices utilizing the thermal recording medium of the invention.

Within FIG. 8, the recording medium 10 is originally wound on the roll 16 and moves in the direction of the roll 17 which winds the used medium. A recording sheet 20 is originally wound on the roll 18 and moves in the direction of the roll 15 after an image is formed thereon. The image is formed on the recording sheet 20 by the utilization of the heating element 13 which may be a laser in connection with a power source or heat-generating control mechanism 14. Rather than winding the sheet 20 on roll 15, it may simply pass between the rolls 15 and 19 and be cut into appropriate shapes if necessary.

The embodiment of the device shown within FIG. 9 is similar to that shown in FIG. 8. Heat-generating head 21 has a precisely positioned heat-generating element 21a. The amount of heat present at the element 21a is controlled by the heat-generating head control circuit 26. The roll 24 holds the recording medium 10, which moves in the direction of the roll 27 utilized for winding the medium 10 after it has been used for forming an image on the recording sheet 23. The backing rolls 22 and 25 are used for holding the recording sheet 23 firmly against the medium 10. When the recording medium 10 is brought into close contact with the recording sheet 23, at the heat-generating element 21a, heat is generated and the ink on the medium 10 is melted in the appropriate manner and the melted ink may be transferred to the recording sheet 23. The control device 26 controls the amount of heat as well as the timing, and perhaps in part, location, at which the heat is applied, making it possible to form any desirable image of light, intermediate and dark tones. The results of utilizing the recording medium of the present invention are shown within FIG. 7 and graphically is shown within FIG. 10 with respect to a recording medium as shown within FIG. 5.

Figure 11:
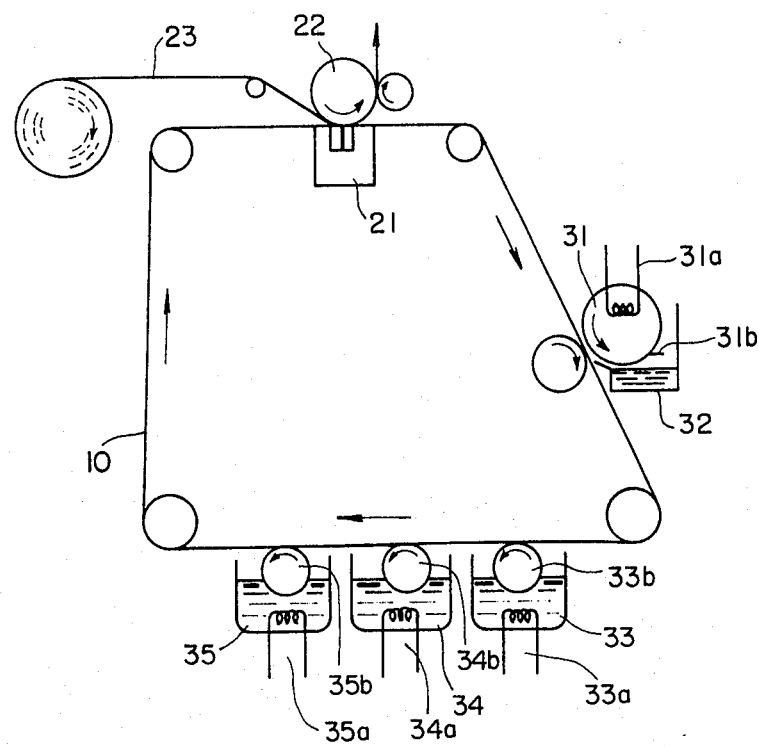
FIG. 11 is a schematic plan view of a copying machine in which the thermorecording medium of the present invention can be continuously and repeatedly utilized in the form of an endless belt.

By referring now to FIG. 11, a device and process for continuously producing and utilizing the thermosensitive recording medium of the present invention can be explained in detail. The multi-layered recording medium 10 as shown within FIG. 5, is produced in accordance with the process as shown within FIG. 11. The substrate 11 is moved into contact with coating rolls 33b, 34b and 35b which are respectively positioned in contact with ink in ink tanks 33, 34 and 35. Each of the tanks 33, 34 and 35 are heated by heating coils 33a, 34a and 35a, respectively. When the materials such as disclosed within Table 2 are utilized, the ink within tank 33 is maintained at a temperature of about 60° to 70° C., with the ink in tank 34 maintained at a temperature of about 70° to 80° C., and the ink within tank 35 maintained at a temperature of somewhat above 80° C.

By moving the substrate across the rollers which are continuously coated with the ink from their respective tanks, the recording medium 10 as shown within FIG. 5 is formed and moved in the direction of the heat-generating head 21 and back roll 22. A recording sheet 23 is moved into contact with the recording medium 10 at the position of a heating element of the heating head 21. Thereafter, an image is formed on the recording sheet 23 in a manner as shown within FIG. 7.

Not all of the ink on the recording medium 10 is removed and placed onto the recording sheet 23. Accordingly, the used recording medium is brought into contact with the heated roller 31, heated by means of heater 31a, to a temperature above 80° C. Accordingly, the remainder of the ink on the medium 10 is liquified and is scraped off by a blade 31b and held within tank 32. The base sheet 11 is then recoated with the ink layers 12a, 12b, and 12c in the manner described above.

The instant invention has been shown and described herein in what is considered to be the most practical and preferred embodiments. However, it is recognized that departures may be made therefrom which are within the scope of the invention, and that modifications will occur to one skilled in the art upon reading this description.

What is claimed is:

1. A thermal recording medium, comprising:
   a base support layer;
   a plurality of heat sensitive ink materials positioned on a surface of said base support layer, each of said heat-sensitive ink materials having a different melting point,
   wherein said heat-sensitive ink materials comprises; a single layer having three heat-sensitive ink materials of different melting points positioned on said surface of said support in a regular pattern.

2. A thermal recording medium, as claimed in claim 1, wherein a first one of said heat-sensitive ink materials has a melting point of about 60° C. and a second one of said heat-sensitive ink materials has a melting point of about 70° C. and a third one of said heat-sensitive ink materials has a melting point of about 80° C.

3. A thermal recording medium for transferring an image onto a data recording sheet, comprising:
   a base support layer;
   a first layer of a first heat-sensitive ink material superimposed on a surface of said base support layer;
   a second layer comprised of a second heat-sensitive ink material superimposed on said first layer; and
   a third layer comprised of a heat-sensitive ink material superimposed on said second layer, wherein when heat is applied to said first, second and third heat sensitive ink materials, a transfer from said recording medium onto a data recording sheet occurs with an image adhering to said data recording sheet.

4. A thermal recording medium as claimed in claim 3, wherein each of said first, second and third heat-sensitive ink materials has a different melting point.

5. A thermal recording medium, as claimed in claim 4, wherein said third layer has a melting point above that of said second layer and wherein said second layer has a melting point above that of said first layer.

6. A thermal recording medium, as claimed in claim 5, wherein said first heat-sensitive ink material has a melting point of about 60° C. and said second heat-sensitive ink material has a melting point of about 70° C. and said third heat-sensitive ink material has a melting point of about 80° C.

7. A process for producing an image on a recording sheet, comprising the steps of:
   providing a plurality of heat-sensitive ink materials, each having different melting points, on a surface of a base support;
   positioning said ink materials on said base support in contact with said recording sheet; and
   applying heat to said heat-sensitive ink materials in contact with said recording sheet to an extent sufficient to liquify heat-sensitive ink material on said support, such that said liquified ink material transfers from the base support to the recording sheet and adheres to said recording sheet forming an image thereon.

8. A process for forming an image on a recording sheet, comprising the steps of:
   positioning an endless belt support in contact with rotating means in such a manner that said endless belt is continuously rotated;
   contacting a surface of said belt with a first heat-sensitive material so as to coat said first heat-sensitive material on said belt;
   contacting a second heat-sensitive ink material with said belt in such a manner that said second heat-sensitive ink material is coated on said first heat-sensitive ink material; and
   contacting a third heat-sensitive ink material with said belt in such a manner that said third heat-sensitive ink material is coated on said second heat-sensitive ink material;
   positioning said recording sheet in contact with said belt having said first, second and third heat-sensitive ink materials coated thereon;
   applying heat to said heat-sensitive ink materials in an amount to liquify heat-sensitive ink material;
   allowing said liquified heat-sensitive ink material to form an image on said recording sheet;
   heating said heat-sensitive ink materials on said belt after contact with said recording sheet to a temperature sufficient to completely liquify said heat-sensitive ink materials;
   removing said liquified heat-sensitive ink materials from said support.

* * * * *